(12) United States Patent
Asai et al.

(10) Patent No.: US 6,652,640 B2
(45) Date of Patent: Nov. 25, 2003

(54) SURFACE TREATING AGENT AND WATER REPELLENT, OIL REPELLENT ARTICLE

(75) Inventors: Mitsuo Asai, Gunma-ken (JP); Hitoshi Uehara, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 305 days.

(21) Appl. No.: 09/893,601

(22) Filed: Jun. 29, 2001

(65) Prior Publication Data
US 2002/0020326 A1 Feb. 21, 2002

(30) Foreign Application Priority Data
Jun. 29, 2000 (JP) ........................................ 2000-196928

(51) Int. Cl.⁷ ............................ C09D 5/20; C09D 5/00; C09D 7/00; B32B 9/04
(52) U.S. Cl. .............................. 106/287.11; 106/287.13; 106/287.14; 106/2; 428/447
(58) Field of Search .................. 106/287.11, 287.13, 106/287.14, 2; 428/447

(56) References Cited

U.S. PATENT DOCUMENTS

| | | | |
|---|---|---|---|
| 4,600,436 A | * | 7/1986 | Traver et al. .................. 106/3 |
| 4,678,688 A | | 7/1987 | Itoh et al. |
| 5,429,673 A | * | 7/1995 | Peterson et al. ....... 106/287.11 |
| 6,140,451 A | | 10/2000 | Asai et al. |
| 6,537,672 B1 | * | 3/2003 | Dittfurth et al. ............ 428/413 |

FOREIGN PATENT DOCUMENTS

| | | |
|---|---|---|
| JP | 60-221470 | 11/1985 |
| JP | 11-116809 | 4/1999 |
| JP | 11-116810 | 4/1999 |
| JP | 11-116810 A | 4/1999 |

OTHER PUBLICATIONS

Abstract of Japanese 60–221470 (Nov. 1985).
Abstract of Japanese 11–116809 (Apr. 1999).
Abstract of Japanese 11–116810 (Apr. 1999).

* cited by examiner

Primary Examiner—Elizabeth D. Wood
(74) Attorney, Agent, or Firm—Millen, White, Zelano & Branigan, P.C.

(57) ABSTRACT

A surface treating agent is comprised of the reaction product obtained by reacting with ammonia a mixture of (A) an organosilicon compound having a fluorinated organic group and (B) an organosilicon compound having a hydrolyzable group. Substrates treated therewith exhibit high water and oil repellency and allow sticking contaminants to be effectively wiped off.

4 Claims, No Drawings

SURFACE TREATING AGENT AND WATER REPELLENT, OIL REPELLENT ARTICLE

This invention relates to surface treating agents for treating surfaces of glass, glass lenses, mirrors, plastics, plastic lenses, metals, ceramics, porcelain and earthenware to form antifouling coatings which are tack-free, non-adherent to dust and debris, and repellent to both water and oil. It also relates to articles treated with the surface treating agents.

BACKGROUND OF THE INVENTION

It is known in the art to coat optical lenses such as eyeglass lenses and camera lenses with layers of cured silicone and/or fluorocarbon polymers in order to impart antifouling property and water repellency to the lenses. The treating agents proposed thus far to this end are typified by trifunctional organosilicon compounds such as $C_8F_{17}C_2H_4SiCl_3$ and $C_4F_9C_2H_4Si(NH)_{3/2}$ or partial hydrolyzates thereof as disclosed in JP-A 60-221470.

When substrates are treated with such trifunctional compounds alone, the surface is covered with only a polymer having a three-dimensional structure so that the surface remains flexible or rather tacky. Undesirably, dust and debris will adhere to such surface, and fingerprints resulting from hand touch are left stuck thereto.

Then JP-A 11-116809 and JP-A 11-116810 propose surface treating agents comprising a trifunctional fluorinated silazane compound and an organopolysiloxane containing a hydrolyzable group such as alkoxy group. However, the hydrolyzable group such as alkoxy group can interfere with cure.

SUMMARY OF THE INVENTION

Therefore, an object of the invention is to provide a surface treating agent which has antifouling, water repellent and oil repellent properties and is effectively curable to form an antifouling coating whose surface is tack-free and non-adherent to dust and debris. Another object is to provide a surface treated article.

It has been found that the reaction product obtained by reacting a mixture of an organosilicon compound of the general formula (1) and an organosilicon compound of the general formula (2) with ammonia, or a mixture of the reaction product obtained by reacting an organosilicon compound of the general formula (1) with ammonia and the reaction product obtained by reacting an organosilicon compound of the general formula (2) with ammonia is effective as a surface treating agent. When surfaces of substrates such as glass, glass lenses, mirrors, plastics, plastic lenses, metals, ceramics, porcelain and earthenware are treated therewith, antifouling coatings are formed on the substrate surfaces, which coatings are tack-free, non-adherent to dust and debris, and repellent to both water and oil.

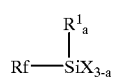

(1)

Herein Rf is a fluorinated organic group of 1 to 12 carbon atoms, $R^1$ is a monovalent hydrocarbon group of 1 to 10 carbon atoms, X is a halogen atom, and "a" is 0, 1 or 2.

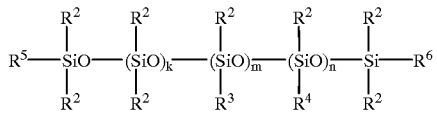

(2)

Herein $R^2$, which may be the same or different, is a monovalent hydrocarbon group of 1 to 10 carbon atoms, $R^3$ is a monovalent hydrocarbon group of 1 to 10 carbon atoms which may contain a fluorine atom, $R^4$ is a hydrolyzable group of the general formula (3), $R^5$ and $R^6$ are as defined for $R^2$ or $R^4$, k is an integer of 0 to 100, m is an integer of 0 to 100, n is an integer of 0 to 5, k+m+n is from 0 to 200, with the proviso that the compound of formula (2) contains at least one $R^4$ per molecule.

(3)

Herein $R^7$ is a monovalent hydrocarbon group of 1 to 10 carbon atoms, $R^8$ is a divalent hydrocarbon group of 2 to 10 carbon atoms or oxygen atom, X is a halogen atom, and "b" is 0, 1 or 2.

DESCRIPTION OF THE PREFERRED EMBODIMENTS

In the first embodiment of the invention, the surface treating agent contains the reaction product obtained by reacting a mixture of (A) an organosilicon compound of the general formula (1) and (B) an organosilicon compound of the general formula (2) with ammonia.

(1)

Herein Rf is a fluorinated organic group of 1 to 12 carbon atoms, $R^1$ is a monovalent hydrocarbon group of 1 to 10 carbon atoms, X is a halogen atom, and "a" is 0, 1 or 2.

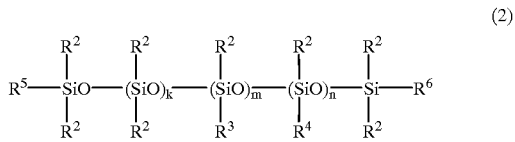

(2)

Herein $R^2$, which may be the same or different, is a monovalent hydrocarbon group of 1 to 10 carbon atoms, $R^3$ is a monovalent hydrocarbon group of 1 to 10 carbon atoms which may contain a fluorine atom, $R^4$ is a hydrolyzable group of the general formula (3), $R^5$ and $R^6$ are as defined for $R^2$ or $R^4$, k is an integer of 0 to 100, m is an integer of 0 to 100, n is an integer of 0 to 5, k+m+n is from 0 to 200, with the proviso that the compound of formula (2) contains at least one $R^4$ per molecule.

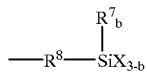
(3)

Herein $R^7$ is a monovalent hydrocarbon group of 1 to 10 carbon atoms, $R^8$ is a divalent hydrocarbon group of 2 to 10 carbon atoms or oxygen atom, X is a halogen atom, and "b" is 0, 1 or 2.

In formula (1), the fluorinated organic groups represented by Rf are not critical as long as they have 1 to 12 carbon atoms. Typical are perfluoroalkylene groups bound to a silicon atom directly or through an alkylene group. Preferred groups are perfluoroalkylene groups represented by

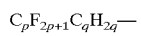

wherein p is an integer of 1 to 8, preferably 4 to 8, q is an integer of 0 to 10, preferably 2 or 3, and p+q is from 1 to 12. Specific examples are $CF_3$—$C_2H_4$—, $C_4F_9$—$C_2H_4$—, $C_8F_{17}$—$C_2H_4$— and $C_8F_{17}$—$C_3H_6$— groups. Examples of the monovalent hydrocarbon groups represented by $R^1$ include alkyl groups such as methyl, ethyl, propyl, butyl and hexyl, alkenyl groups such as vinyl and allyl, aryl groups such as phenyl and tolyl, and aralkyl groups such as benzyl. Of these, methyl, ethyl, propyl and phenyl are preferred, with methyl being especially preferred.

In formulas (2) and (3), the monovalent hydrocarbon groups represented by $R^2$, $R^3$ and $R^7$ are as exemplified for $R^1$. The monovalent hydrocarbon groups represented by $R^3$ may contain fluorine atoms, and such groups correspond to, for example, the foregoing alkyl, alkenyl, aryl and aralkyl groups in which some or all of the hydrogen atoms attached to carbon atoms are substituted with fluorine atoms as well as those groups exemplified for Rf, especially perfluoroalkylene groups of $C_pF_{2p+1}C_qH_{2q}$—. Examples of the divalent hydrocarbon groups represented by $R^8$ include alkylene groups such as ethylene, propylene, butylene and hexylene. Exemplary halogen atoms represented by X are chlorine and bromine, with chlorine being especially preferred. Letter k is an integer of 0 to 100, preferably 0 to 50; m is an integer of 0 to 100, preferably 0 to 25; n is an integer of 0 to 5; and k+m+n is from 0 to 200, preferably from 0 to 70.

The organosilicon compound of formula (2) contains per molecule at least one $R^4$, that is, hydrolyzable group of formula (3). The hydrolyzable group may be attached to a side chain or an end of the polysiloxane molecule or both.

Examples of the organosilicon compound of formula (2) are given below.

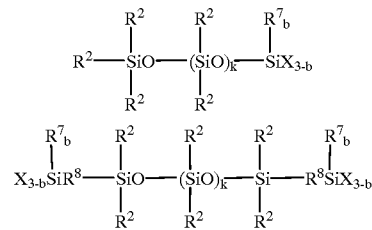

-continued

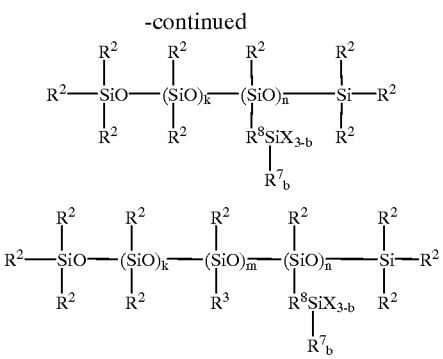

Herein, $R^2$, $R^3$, $R^7$, $R^8$, X, k, m, n, and b are as defined above. Preferably b is 0.

Illustrative, non-limiting, examples of the organosilicon compound of formula (2) are given below.

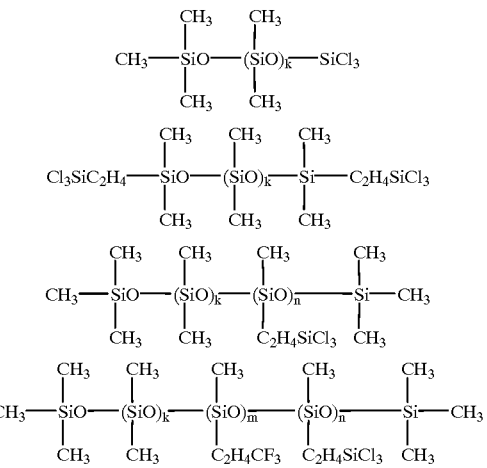

The mixing ratio of (A) the organosilicon compound of formula (1) and (B) the organosilicon compound of formula (2) is not critical although it preferably ranges from 1:0.1 to 0.1:1, especially from 0.5:1 to 1:0.5 on a weight basis. Outside the range, less amounts of the organosilicon compound of formula (1) may lead to shortage of oil repellency whereas less amounts of the organosilicon compound of formula (2) may result in rather tacky surface coatings. In either case, the desired antifouling property may not be obtained.

In reacting the mixture of organosilicon compounds of formulas (1) and (2) with ammonia, the mixture is previously dissolved in a suitable solvent. The solvent used herein is not critical although solvents containing fluorine atom such as m-xylene hexafluoride, pentafluorodichloropropane and octadecafluorooctane are preferred because of good solubility.

For reaction with ammonia, ammonia gas is blown into the mixture so that ammonia reacts with halogen atoms on the organosilicon compounds of formulas (1) and (2). As to the reaction conditions, at least an equimolar amount to the halogen atoms of ammonia is reacted at room temperature to a temperature below the boiling point of the solvent. Reaction completes within a short time.

At the end of reaction, the resulting ammonium chloride is filtered off. The reaction product is ready for use as a surface treating agent and if desired, after it is further diluted with a solvent as described above.

In the second embodiment of the invention, the surface treating agent contains a mixture of (A') the reaction product obtained by reacting (A) an organosilicon compound of the general formula (1) with ammonia, and (B') the reaction product obtained by reacting (B) an organosilicon compound of the general formula (2) with ammonia.

For reactions of components (A) and (B) with ammonia, a method as described above may be employed. The resulting reaction products are admixed to provide the surface treating agent.

The mixing ratio of reaction product (A') and reaction product (B') is not critical although it preferably ranges from 1:0.1 to 0.1:1, especially from 0.5:1 to 1:0.5 on a weight basis. Outside the range, less amounts of reaction product (A') may lead to shortage of oil repellency whereas less amounts of reaction product (B') may result in rather tacky surface coatings. In either case, the desired antifouling property may not be obtained.

The surface treating agent of the second embodiment may also be used as a solution in a solvent as mentioned above.

The reaction product (A') mainly contains a compound of the general formula (4). The reaction product (B') mainly contains a compound of the general formula (5). Also the reaction product of the mixture of components (A) and (B) with ammonia may contain compounds of formulas (4) and (5).

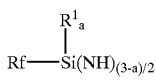

(4)

Herein, Rf, $R^1$ and "a" are as defined above.

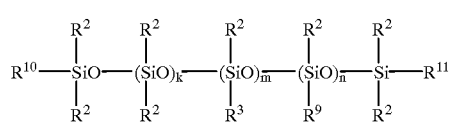

(5)

Herein, $R^2$, $R^3$, k, m and n are as defined above; $R^9$ is a hydrolyzable group of the following formula (6); $R^{10}$ and $R^{11}$ are as defined for $R^2$ or $R^9$; with the proviso that the compound of formula (5) contains at least one $R^9$ per molecule.

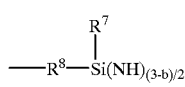

(6)

Herein, $R^7$, $R^8$ and b are as defined above.

The compounds of formula (5) are exemplified by the following formulas.

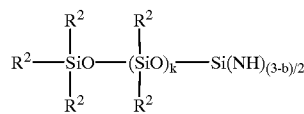

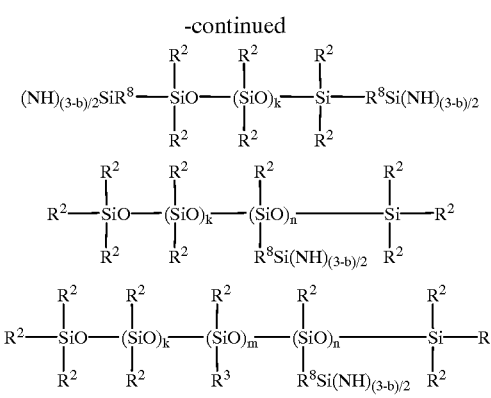

Herein, $R^2$, $R^3$, $R^8$, k, m, n and b are as defined above. Preferably b is 0.

Illustrative, non-limiting, examples of the compounds of formula (5) are given below.

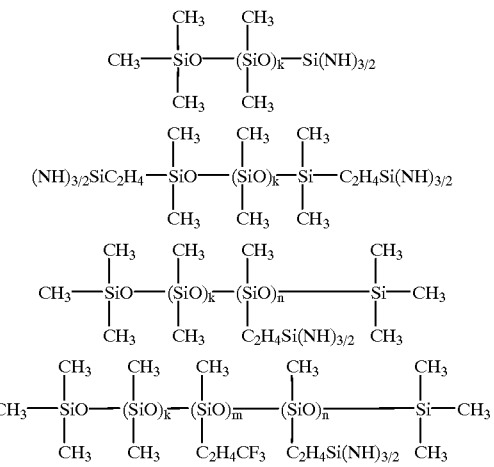

Accordingly, the invention also provides a surface treating agent comprising the compounds of formulas (4) and (5). The mixing ratio of the compound of formula (4) and the compound of formula (5) preferably ranges from 1:0.1 to 0.1:1, especially from 0.5:1 to 1:0.5 on a weight basis. Outside the range, less amounts of the compound of formula (4) may lead to shortage of oil repellency whereas less amounts of the compound of formula (5) may result in rather tacky surface coatings. In either case, the desired antifouling property may not be obtained. As in the previous embodiments, this surface treating agent may also be used as a solution in a solvent such as fluorine atom-containing solvents.

In the surface treating agent, the concentration of the reaction product of a mixture of components (A) and (B) or the concentration of a mixture of the reaction products of components (A) and (B) may be set as appropriate depending on a particular application method. Usually, a concentration of at least 0.1% by weight, especially at least 0.5% by weight is desirable to achieve satisfactory water repellent, antifouling functions.

Any desired substrate can be treated with the surface treating agent according to the invention. Included are inorganic materials such as glass, glass lenses, mirrors, metals, ceramics, porcelain and earthenware; organic materials such as rubber and plastics; and optical functional materials such as plastic lenses and liquid crystal display filters.

It is not critical how to treat substrates with the surface treating agent. For example, substrates are wiped with fabrics impregnated with the agent. Other useful application methods include brush coating, dipping, spin coating, curtain coating and vacuum evaporation.

EXAMPLE

Examples of the invention are given below by way of illustration and not by way of limitation.

Examples 1–18 and Comparative Examples 1–6

Several substrates were treated with surface treating agents. The performance of the treated substrates was examined, with the results shown in Table 1.

Substrate

Glass: float glass whose surface was previously cleaned with acetone

Plastic lens: polycarbonate lens having a hard coat applied on the surface and silica evaporated thereon PET film: polyethylene terephthalate film having silica evaporated thereon Treatment The substrate was immersed in the surface treating agent for 5 minutes, taken out, cleaned by immersing it twice in the same solvent as used in the surface treating agent for one minute each time, then dried at 100° C. for 10 minutes.

Formulation of Surface Treating Agent

Organosilicon compound solution 1-1: 3% m-xylene hexafluoride solution of $C_4F_9C_2H_4Si(NH)_{3/2}$ synthesized by reacting $C_4F_9C_2H_4SiCl_3$ with ammonia Organosilicon compound solution 1-2: 3% m-xylene hexafluoride solution of $C_8F_{17}C_2H_4Si(NH)_{3/2}$ synthesized by reacting $C_8F_{17}C_2H_4SiCl_3$ with ammonia Organosilicon compound solution 2-1: 3% m-xylene hexafluoride solution of

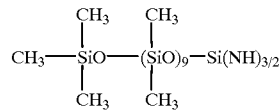

synthesized by reacting

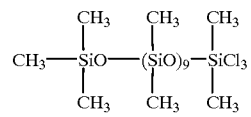

with ammonia

Organosilicon compound solution 2-2: 3% m-xylene hexafluoride solution of

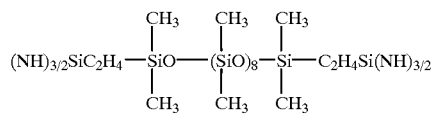

synthesized by reacting

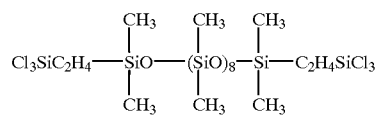

with ammonia

Organosilicon compound solution 2-3: 3% m-xylene hexafluoride solution of

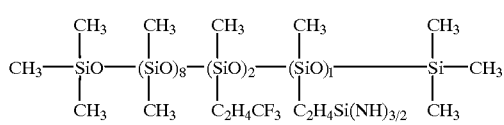

synthesized by reacting

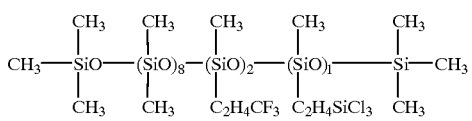

with ammonia

Surface treating agent 1-1: a mixture of 1 part by weight of organosilicon compound solution 1-1 and 1 part by weight of organosilicon compound solution 2-1

Surface treating agent 1-2: a mixture of 3 parts by weight of organosilicon compound solution 1-2 and 1 part by weight of organosilicon compound solution 2-2

Surface treating agent 1-3: a mixture of 3 parts by weight of organosilicon compound solution 1-2 and 1 part by weight of organosilicon compound solution 2-3

Surface treating agent 2-1: a silazane compound solution obtained by blowing 2.8 parts by weight of ammonia gas into a mixture of 3 parts by weight of $C_4F_9C_2H_4SiCl_3$, 3 parts by weight of a compound of the following formula (I) and 94 parts by weight of m-xylene hexafluoride at 60° C., cooling the reaction solution, filtering off the ammonium chloride, and further diluting the resultant solution with m-xylene hexafluoride to a 3-fold volume.

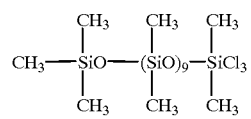
(I)

Surface treating agent 2-2: a silazane compound solution obtained by blowing 1.8 parts by weight of ammonia gas into a mixture of 3 parts by weight of $C_8F_{17}C_2H_4SiCl_3$, 1 part by weight of a compound of the following formula (II) and 96 parts by weight of m-xylene hexafluoride at 60° C., cooling the reaction solution, filtering off the ammonium chloride, and further diluting the resultant solution with m-xylene hexafluoride to a 2-fold volume.

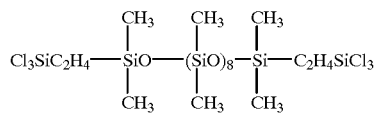

(II)

Surface treating agent 2-3: a silazane compound solution obtained by blowing 1.6 parts by weight of ammonia gas into a mixture of 3 parts by weight of $C_8F_{17}C_2H_4SiCl_3$, 1 part by weight of a compound of the following formula (III) and 96 parts by weight of m-xylene hexafluoride at 60° C., cooling the reaction solution, filtering off the ammonium chloride, and further diluting the resultant solution with m-xylene hexafluoride to a 2-fold volume.

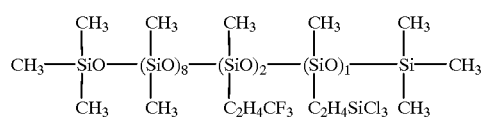

(III)

Surface treating agent 3-1: organosilicon compound solution 1-2

Surface treating agent 3-2: organosilicon compound solution 2-1

Tests

Contact Angle:

Contact angles with water and hexadecane were measured by a contact angle meter Model CA-X150 (by Kyowa Kaimen Kagaku K. K.)

Fingerprint Wiping:

The righthand thumb was pressed to the treated substrate and after 1 hour, the fingerprint was wiped ten strokes with tissue paper.

A: fingerprint wiped off
B: some fingerprint left
C: fingerprint substantially left

TABLE 1

| | Surface treating agent | Substrate | Contact angle (°) | | Finger-print wiping |
|---|---|---|---|---|---|
| | | | Water | Hexadecane | |
| Example 1 | 1-1 | glass | 102.1 | 78.1 | A |
| Example 2 | 1-2 | glass | 106.3 | 78.2 | A |
| Example 3 | 1-3 | glass | 107.2 | 78.3 | A |
| Example 4 | 2-1 | glass | 102.6 | 77.3 | A |
| Example 5 | 2-2 | glass | 108.7 | 79.1 | A |
| Example 6 | 2-3 | glass | 107.1 | 79.5 | A |
| Example 7 | 1-1 | plastic lens | 112.4 | 75.3 | A |
| Example 8 | 1-2 | plastic lens | 114.5 | 78.4 | A |
| Example 9 | 1-3 | plastic lens | 117.0 | 77.9 | A |
| Example 10 | 2-1 | plastic lens | 113.2 | 76.1 | A |
| Example 11 | 2-2 | plastic lens | 115.6 | 79.5 | A |
| Example 12 | 2-3 | plastic lens | 116.7 | 74.9 | A |
| Example 13 | 1-1 | PET film | 101.0 | 73.4 | A |
| Example 14 | 1-2 | PET film | 103.2 | 74.9 | A |
| Example 15 | 1-3 | PET film | 104.4 | 76.2 | A |
| Example 16 | 2-1 | PET film | 102.0 | 74.5 | A |
| Example 17 | 2-2 | PET film | 104.8 | 78.0 | A |
| Example 18 | 2-3 | PET film | 105.6 | 77.5 | A |
| Comparative Example 1 | 3-1 | glass | 108.1 | 79.3 | B |
| Comparative Example 2 | 3-2 | glass | 94.3 | 56.1 | B |
| Comparative Example 3 | 3-1 | plastic lens | 115.7 | 79.1 | C |

TABLE 1-continued

| | Surface treating agent | Substrate | Contact angle (°) | | Finger-print wiping |
|---|---|---|---|---|---|
| | | | Water | Hexadecane | |
| Comparative Example 4 | 3-2 | plastic lens | 98.9 | 58.1 | B |
| Comparative Example 5 | 3-1 | PET film | 105.4 | 78.9 | C |
| Comparative Example 6 | 3-2 | PET film | 92.1 | 59.8 | B |

It is evident that the substrates treated with the surface treating agents within the scope of the invention exhibit high water repellency and oil repellency and allow sticking contaminants to be effectively wiped off.

Japanese Patent Application No. 2000-196928 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A surface treating agent comprising the reaction product obtained by reacting with ammonia a mixture of (A) an organosilicon compound of the general formula (1) and (B) an organosilicon compound of the general formula (2):

(1)

wherein Rf is a fluorinated organic group of 1 to 12 carbon atoms, $R^1$ is a monovalent hydrocarbon group of 1 to 10 carbon atoms, X is a halogen atom, and "a" is 0, 1 or 2,

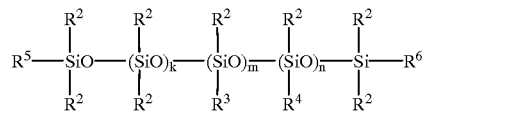

(2)

wherein $R^2$, which may be the same or different, is a monovalent hydrocarbon group of 1 to 10 carbon atoms, $R^3$ is a monovalent hydrocarbon group of 1 to 10 carbon atoms which may contain a fluorine atom, $R^4$ is a hydrolyzable group of the general formula (3), $R^5$ and $R^6$ are as defined for $R^2$ or $R^4$, k is an integer of 0 to 100, m is an integer of 0 to 100, n is an integer of 0 to 5, k+m+n is from 0 to 200, with the proviso that the compound of formula (2) contains at least one $R^4$ per molecule,

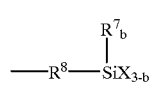

(3)

wherein $R^7$ is a monovalent hydrocarbon group of 1 to 10 carbon atoms, $R^8$ is a divalent hydrocarbon group of 2 to 10 carbon atoms or oxygen atom, X is a halogen atom, and "b" is 0, 1 or 2.

2. A surface treating agent comprising a mixture of
(A') the reaction product obtained by reacting with ammonia an organosilicon compound of the general formula (1):

(1)

wherein Rf is a fluorinated organic group of 1 to 12 carbon atoms, $R^1$ is a monovalent hydrocarbon group of 1 to 10 carbon atoms, X is a halogen atom, and "a" is 0, 1 or 2, and (B') the reaction product obtained by reacting with ammonia an organosilicon compound of the general formula (2):

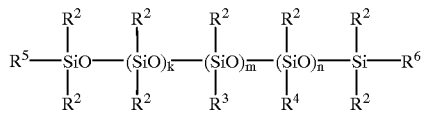

(2)

wherein $R^2$, which may be the same or different, is a monovalent hydrocarbon group of 1 to 10 carbon atoms, $R^3$ is a monovalent hydrocarbon group of 1 to 10 carbon atoms which may contain a fluorine atom, $R^4$ is a hydrolyzable group of the general formula (3), $R^5$ and $R^6$ are as defined for $R^2$ or $R^4$, k is an integer of 0 to 100, m is an integer of 0 to 100, n is an integer of 0 to 5, k+m+n is from 0 to 200, with the proviso that the compound of formula (2) contains at least one $R^4$ per molecule,

(3)

wherein $R^7$ is a monovalent hydrocarbon group of 1 to 10 carbon atoms, $R^8$ is a divalent hydrocarbon group of 2 to 10 carbon atoms or oxygen atom, X is a halogen atom, and "b" is 0, 1 or 2.

3. The surface treating agent of claim 1, further comprising a solvent containing fluorine atom.

4. A water repellent, oil repellent article which has been surface treated with the surface treating agent of claim 1.

* * * * *